(12) United States Patent
Nakajima et al.

(10) Patent No.: US 12,325,100 B2
(45) Date of Patent: Jun. 10, 2025

(54) MACHINE TOOL, MACHINE TOOL CONTROL METHOD, AND NON-TRANSITORY COMPUTER-READABLE MEDIUM

(71) Applicant: DMG MORI CO., LTD., Nara (JP)

(72) Inventors: Yoshihiko Nakajima, Nara (JP); Kenjiro Iga, Nara (JP); Hiroshi Shimanoe, Nara (JP)

(73) Assignee: DMG MORI CO., LTD., Nara (JP)

( * ) Notice: Subject to any disclaimer, the term of this patent is extended or adjusted under 35 U.S.C. 154(b) by 467 days.

(21) Appl. No.: 17/913,513

(22) PCT Filed: Mar. 4, 2021

(86) PCT No.: PCT/JP2021/008427
§ 371 (c)(1),
(2) Date: Sep. 22, 2022

(87) PCT Pub. No.: WO2021/192890
PCT Pub. Date: Sep. 30, 2021

(65) Prior Publication Data
US 2023/0144591 A1 May 11, 2023

(30) Foreign Application Priority Data
Mar. 24, 2020 (JP) .................. 2020-052493

(51) Int. Cl.
*B23Q 17/24* (2006.01)
*B23Q 11/00* (2006.01)
(Continued)

(52) U.S. Cl.
CPC ...... *B23Q 17/2409* (2013.01); *B23Q 11/0075* (2013.01); *B23Q 15/22* (2013.01); *B23Q 17/2428* (2013.01); *B23Q 11/10* (2013.01)

(58) Field of Classification Search
None
See application file for complete search history.

(56) References Cited

U.S. PATENT DOCUMENTS 2,502,792 A * 4/1950 Kemper ................. B23Q 11/08
82/152
6,409,641 B1 6/2002 Hashimoto
(Continued)

FOREIGN PATENT DOCUMENTS

| CN | 105729237 A | 7/2016 |
|---|---|---|
| JP | 2000-052185 A | 2/2000 |

(Continued)

*Primary Examiner* — David Earl Ogg
(74) *Attorney, Agent, or Firm* — IP Business Solutions, LLC.

(57) ABSTRACT

A technique for preventing a coolant from adhering to a discharge inhibited portion is provided. A machine tool capable of machining a workpiece includes: a first discharge unit that discharges the coolant removing a chip of the workpiece; a portion inside the machine tool and to which the coolant should not be discharged; a first drive unit that changes a relative position between the first discharge unit and the portion; and a control unit that controls the machine tool. The control unit performs processing for recognizing a position in the machine tool of a moving object by the first drive unit between the first discharge unit and the portion, and processing for controlling the discharge of the coolant by the first discharge unit such that the coolant is not discharged to the portion based on the position recognized in the recognition processing.

20 Claims, 12 Drawing Sheets

(51) Int. Cl.
*B23Q 11/10* (2006.01)
*B23Q 15/22* (2006.01)

(56) References Cited

U.S. PATENT DOCUMENTS

| | | | |
|---|---|---|---|
| 2002/0146297 A1* | 10/2002 | Curtis | B23Q 11/1076 |
| | | | 408/61 |
| 2016/0184951 A1 | 6/2016 | Kurokawa | |
| 2016/0236351 A1* | 8/2016 | Kunihiro | B25J 9/1697 |
| 2017/0144262 A1 | 5/2017 | Okuda | |
| 2018/0071892 A1* | 3/2018 | Jung | B24B 55/02 |

FOREIGN PATENT DOCUMENTS

| | | |
|---|---|---|
| JP | 2006-272494 A | 10/2006 |
| JP | 2017-094420 A | 6/2017 |

* cited by examiner

MACHINE TOOL, MACHINE TOOL CONTROL METHOD, AND NON-TRANSITORY COMPUTER-READABLE MEDIUM

TECHNICAL FIELD

The present disclosure relates to a technique for controlling discharge of a coolant in a machine tool.

BACKGROUND ART

Regarding a technique for removing chip generated by machining of a workpiece with a coolant, Japanese Patent Laying-Open No. 2017-94420 (PTL 1) discloses a machine tool for "detect a place where the chip generated by machining adheres and accumulates inside the cover, and efficiently discharge the chip".

As another example, Japanese Patent Laying-Open No. 2000-52185 (PTL 2) discloses a machine tool cleaning device "capable of cleaning the chip and the like that affect tool replacement".

CITATION LIST

Patent Literature

PTL 1: Japanese Patent Laying-Open No. 2017-94420
PTL 2: Japanese Patent Laying-Open No. 2000-52185

SUMMARY OF INVENTION

Technical Problem

In the machine tool, there is a portion (hereinafter, also referred to as a "discharge inhibited portion") that may fail due to the adhesion of the coolant. Desirably the coolant is prevented from adhering to such the discharge inhibited portion.

The techniques disclosed in PTLs 1, 2 do not prevent the coolant from adhering to the discharge inhibited portion. Accordingly, a technique for preventing the coolant from adhering to the discharge inhibited portion is desired.

Solution to Problem

In an example of the present disclosure, a machine tool capable of machining a workpiece includes: a first discharge unit that discharges a coolant removing a chip of the workpiece; a portion inside the machine tool and to which the coolant should not be discharged; a first drive unit that changes a relative position between the first discharge unit and the portion by moving at least one of the first discharge unit and the portion; and a control unit that controls the machine tool. The control unit performs processing for recognizing a position in the machine tool of a moving object by the first drive unit between the first discharge unit and the portion, and processing for controlling the discharge of the coolant by the first discharge unit such that the coolant is not discharged to the portion based on the position recognized in the recognition processing.

According to an example of the present disclosure, the machine tool further includes a second drive unit that drives a discharge port of the coolant discharged by the first discharge unit. The moving object is the portion. In the control processing, drive of the discharge port by the second drive unit is controlled such that the coolant is not discharged to the position of the portion.

In an example of the present disclosure, the machine tool further includes a second discharge unit that discharges the coolant removing the chip of the workpiece. The control processing includes processing for controlling the discharge of the coolant by the first discharge unit and the discharge of the coolant by the second discharge unit such that the coolant is not discharged to the portion.

In an example of the present disclosure, the machine tool further includes a camera that photographs the portion. A position of the portion in the machine tool is recognized based on an image obtained from the camera.

In an example of the present disclosure, the position of the portion in the machine tool is recognized by analyzing a drive program of the portion by the second drive unit.

In an example of the present disclosure, the control unit further executes processing for recognizing a position of the chip of the workpiece. The control processing includes processing for causing the first drive unit to move the relative position such that the portion is not located between the first discharge unit and the chip when the portion is located between the first discharge unit and the chip, and starting the discharge of the coolant by the first discharge unit after the movement.

In an example of the present disclosure, the portion includes at least one of a sensor measuring a size of a tool for machining the workpiece, a sensor measuring a physical quantity related to the workpiece, a camera provided in the machine tool, a surface of a spindle provided in the machine tool, and a workpiece to be machined by dry machining.

An example of the present disclosure provides a method for controlling a machine tool capable of machining a workpiece. The machine tool includes a discharge unit that discharges a coolant removing a chip of the workpiece, a portion inside the machine tool and to which the coolant should not be discharged, and a drive unit that changes a relative position between the discharge unit and the portion by moving at least one of the discharge unit and the portion. The control method includes: recognizing a position in the machine tool of a moving object by the drive unit between the discharge unit and the portion; and controlling discharge of the coolant by the discharge unit such that the coolant is not discharged to the portion based on the position recognized by the recognizing.

An example of the present disclosure provides a control program for a machine tool capable of machining a workpiece. The machine tool includes a discharge unit that discharges a coolant removing a chip of the workpiece, a portion inside the machine tool and to which the coolant should not be discharged, and a drive unit that changes a relative position between the discharge unit and the portion by moving at least one of the discharge unit and the portion. The control program causes the machine tool to execute: recognizing a position in the machine tool of a moving object by the drive unit between the discharge unit and the portion; and controlling the discharge of the coolant by the discharge unit such that the coolant is not discharged to the portion based on the position recognized in the recognizing.

The foregoing and other objects, features, aspects and advantages of the present invention will become more apparent from the following detailed description of the present invention when taken in conjunction with the accompanying drawings.

DESCRIPTION OF EMBODIMENT

Figure 1:
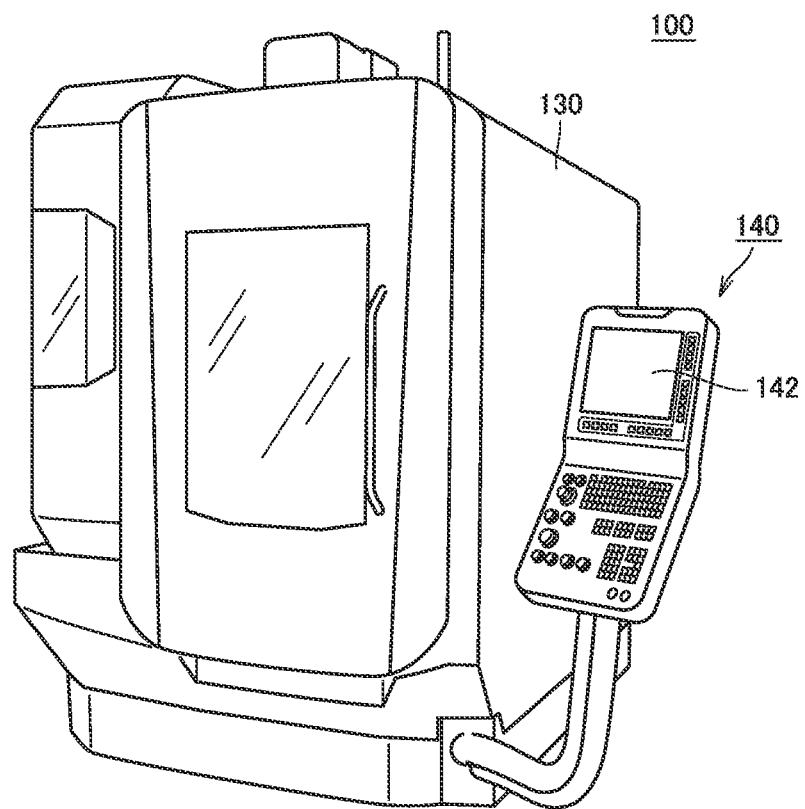
FIG. 1 is a view illustrating an appearance of a machine tool.

With reference to the drawings, an embodiment of the present invention will be described below. In the following description, the same parts and components are denoted by the same reference numeral. Those names and functions are the same. Thus, the detailed description thereof will not be repeated. The following embodiments and modifications described below may selectively be combined as appropriate.

<A. Appearance of Machine Tool 100>

With reference to FIG. 1, a machine tool 100 according to an embodiment will be described. FIG. 1 is a view illustrating an appearance of machine tool 100.

The term "machine tool" used in the present specification is a concept including various devices having a function of processing a workpiece. In the present specification, a horizontal machining center will be described as an example of machine tool 100, but machine tool 100 is not limited thereto. For example, machine tool 100 may be a vertical machining center. Alternatively, machine tool 100 may be a lathe, an additional processing machine, or another cutting machine or grinding machine.

As illustrated in FIG. 1, machine tool 100 includes a cover 130 and an operation panel 140.

Cover 130 is also called a splash guard, and forms an appearance of machine tool 100 and defines a machining area AR (see FIG. 2) of a workpiece W.

Operation panel 140 is a general-purpose computer, and includes a display 142 displaying various types of information about processing. For example, display 142 is a liquid crystal display, an organic electro luminescence (EL) display, or another display device. Display 142 includes a touch panel, and receives various operations on machine tool 100 by touch operations.

<B. Internal Configuration of Machine Tool 100>

Figure 2:
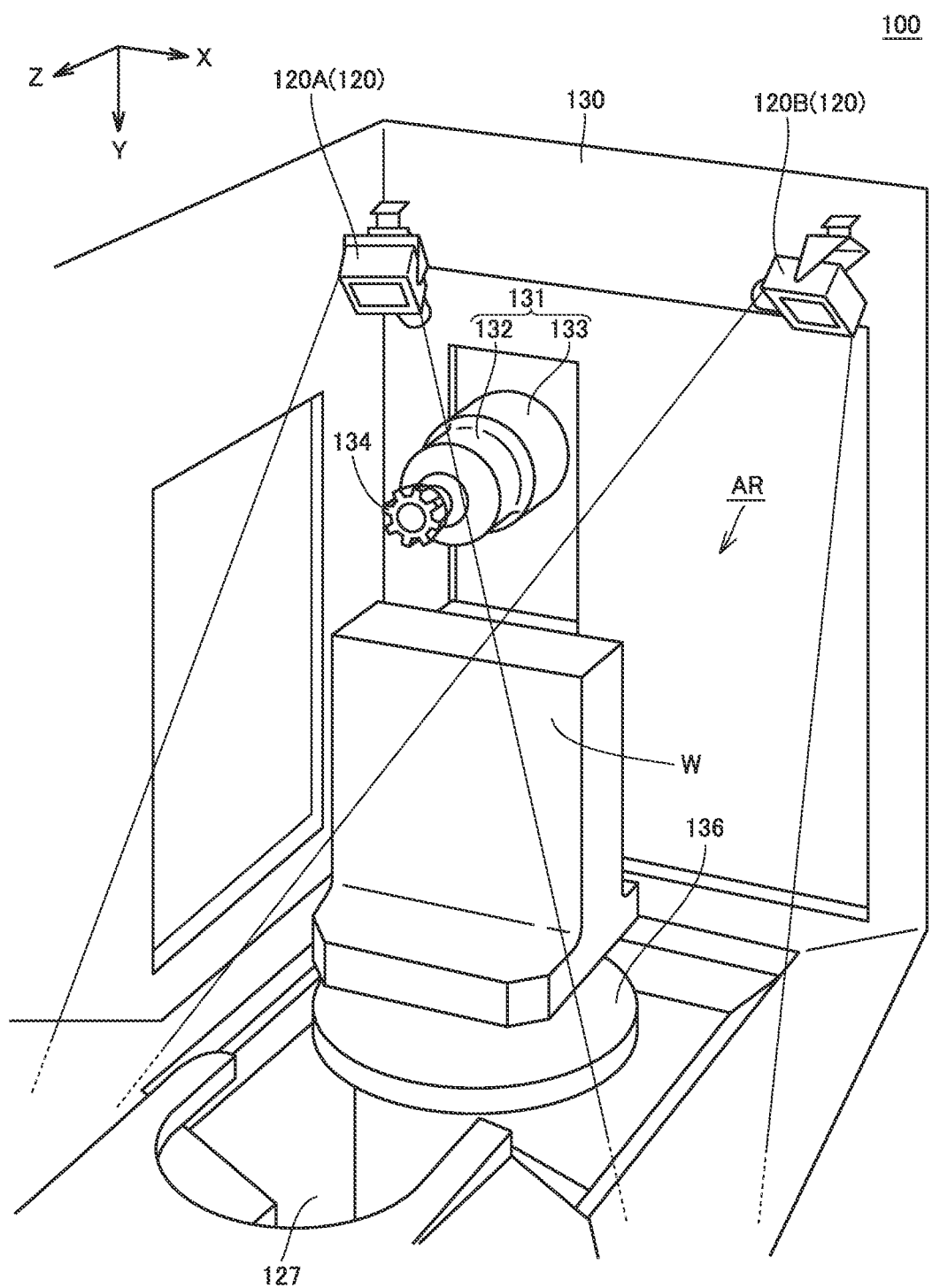
FIG. 2 is a view illustrating a state in the machine tool.
Figure 3:
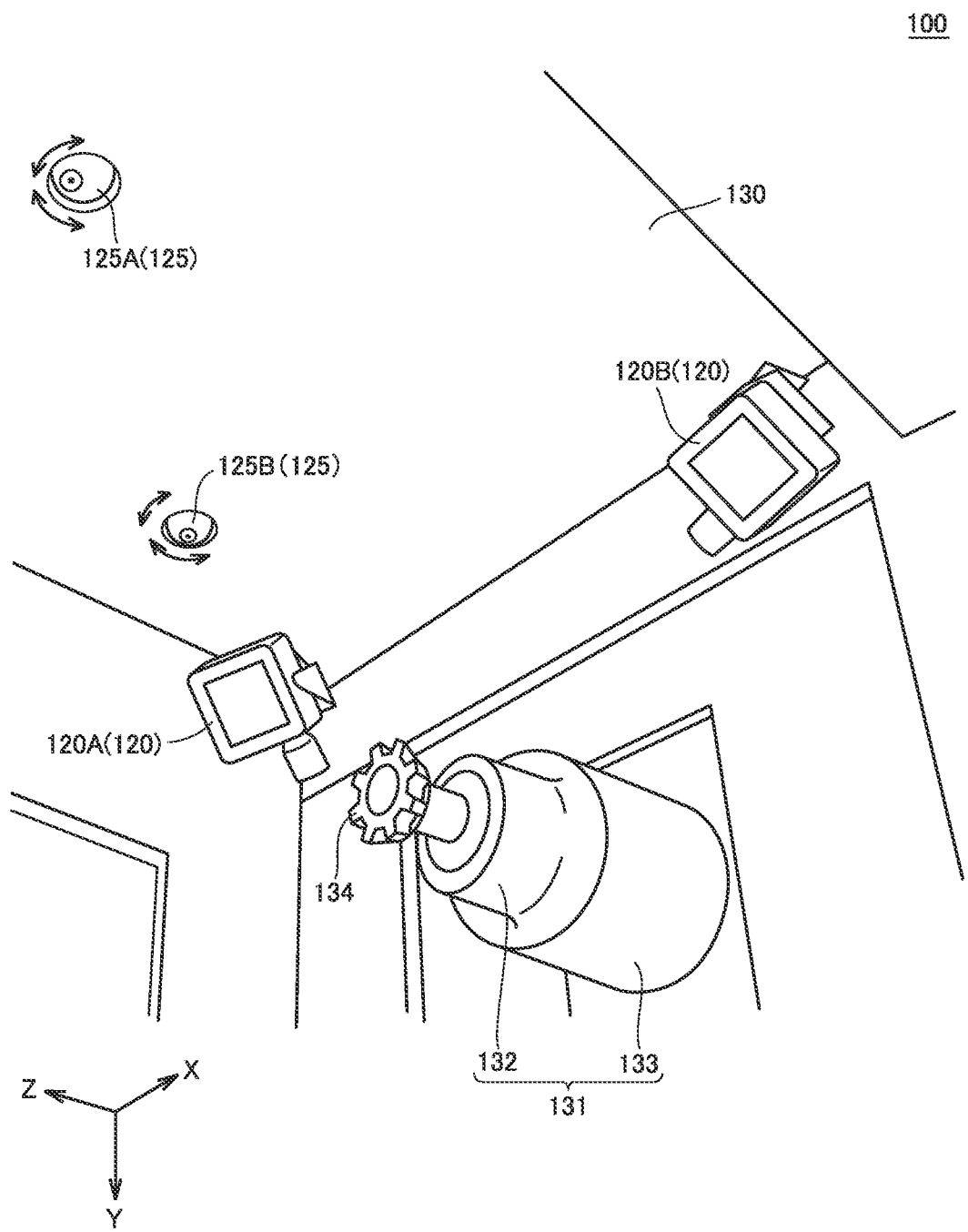
FIG. 3 is a view illustrating the state in the machine tool from a direction different from that in FIG. 2.

With reference to FIGS. 2 and 3, an internal configuration of machine tool 100 will be described below. FIG. 2 is a view illustrating a state in machine tool 100. FIG. 3 is a view illustrating the state in machine tool 100 from a direction different from that in FIG. 2.

As illustrated in FIGS. 2 and 3, machine tool 100 includes cameras 120A, 120B, coolant discharge mechanisms 125A, 125B (first and second discharge units), a chip collection mechanism 127, a spindle head 131, a tool 134, and a table 136. Spindle head 131 includes a spindle 132 and a housing 133.

For convenience of description, hereinafter, the axial direction of spindle 132 is also referred to as a "Z-axis direction". A gravity direction is also referred to as a "Y-axis direction". A direction orthogonal to both the Y-axis direction and the Z-axis direction is referred to as an "X-axis direction".

Furthermore, in the following description, when cameras 120A, 120B are not particularly distinguished, one of cameras 120A, 120B is also referred to as a camera 120. When discharge mechanisms 125A, 125B are not particularly distinguished, one of discharge mechanisms 125A, 125B is also referred to as a discharge mechanism 125.

Camera 120 is disposed so as to include a machining area AR of the workpiece in a field of view of camera 120. For example, camera 120 is provided on one side surface or a ceiling surface of cover 130. Camera 120 may be a charge coupled device (CCD) camera, an infrared camera (thermography), or another types of camera.

Discharge mechanism 125 is provided in machine tool 100. For example, discharge mechanism 125 is provided on one side surface or the ceiling surface of cover 130. Discharge mechanism 125 includes a coolant storage tank, piping, a coolant pump, a coolant nozzle (discharge port), and the like. One end of the pipe is connected to the pump, and the other end of the pipe is connected to the coolant nozzle. The pump draws the coolant from the storage tank and sends the coolant to the coolant nozzle. Thus, the coolant is discharged to machining area AR. By discharging the coolant, the chip generated by machining of workpiece W is collected by collection mechanism 127. Collection mechanism 127 includes a conveyor, a collection unit, and the like, and conveys the chip of workpiece W to the collection unit by the conveyor.

Spindle 132 is provided inside housing 133. A tool for machining workpiece W, which is an object to be machined, is attached to spindle 132. In the examples of FIGS. 2 and 3, a tool 134 used for milling workpiece W is mounted on spindle 132.

Although the example in which two cameras 120A, 120B are provided in machine tool 100 has been described above, the number of cameras is not necessarily two, but may be one or at least three.

In the above description, an example in which two discharge mechanisms 125A, 125B are provided in machine tool 100 has been described. However, the number of discharge mechanisms is not necessarily two, and may be one or at least three.

<C. Discharge Inhibited Portion>

The definition of the term "discharge inhibited portion" used in the present specification will be described below. In the present specification, a portion that may fail due to the adhesion of the coolant is referred to as the "discharge inhibited portion". The discharge inhibited portion may be one component in machine tool 100 or a part of the one component.

As an example, the discharge inhibited portion is a sensor (hereinafter, also referred to as a "tool sensor") measuring a size of the tool used for machining workpiece W. The size is a concept including a diameter of the tool, a length of the tool, a wear amount of the tool, and the like. For example, the tool sensor is provided in machine tool 100 and measures the size of the tool before or after machining the workpiece. For example, the tool sensor is an optical distance sensor, an ultrasonic distance sensor, and a contact measurement device that measures the size of the tool.

As another example, the discharge inhibited portion is a sensor (hereinafter, also referred to as a "workpiece sensor") measuring a physical quantity related to the workpiece. The physical quantity is a concept including a height of the workpiece, a lateral width of the workpiece, a longitudinal width of the workpiece, roughness of the workpiece surface, a temperature of the workpiece, and the like. For example, the workpiece sensor is provided in machine tool 100, and measures physical quantities of the workpiece before machining, the workpiece being machined, and the workpiece after machining. For example, the workpiece sensor is an optical distance sensor, an ultrasonic distance sensor, a contact measurement device that measures the size of the workpiece, or a temperature sensor such as thermography.

As another example, the discharge inhibited portion is a camera provided in machine tool 100. Not only cameras 120A, 120B but also various cameras are provided in machine tool 100. As an example, the camera includes a camera monitoring the machining of workpiece W, a camera monitoring the state of the tool, a camera detecting the chip of the workpiece W, and the like.

As another example, the discharge inhibited portion includes the surface of the spindle 132 extending in the axial direction (that is, in the Z-axis direction) of spindle 132. When the coolant enters between spindle 132 and housing 133, there is a possibility that spindle head 131 fails. In order to prevent this, a labyrinth structure is adopted for a connection portion between spindle 132 and housing 133. In order to more reliably prevent the coolant from entering between spindle 132 and housing 133, preferably the coolant is not attached to the surface portion of spindle 132 corresponding to the labyrinth structure. For this reason, the surface portion of spindle 132 corresponding to the labyrinth structure is an example of the discharge inhibited portion.

As another example, the discharge inhibited portion includes the workpiece to be machined by dry machining. The dry machining is a type of machining method in which the coolant is not attached to the workpiece. Preferably the coolant does not adhere to the workpiece used in such the dry processing. For this reason, the workpiece used in the dry machining is an example of the discharge inhibited portion. For example, whether the machining method is the dry machining is determined based on an instruction code defined in a machining program.

In the following description, the surface of spindle 132 will be described as an example of the discharge inhibited portion. However, the discharge inhibited portion is not limited to the surface of spindle 132, but may be another example described above.

<D. Drive Mechanism of Machine Tool 100>

Figure 4:
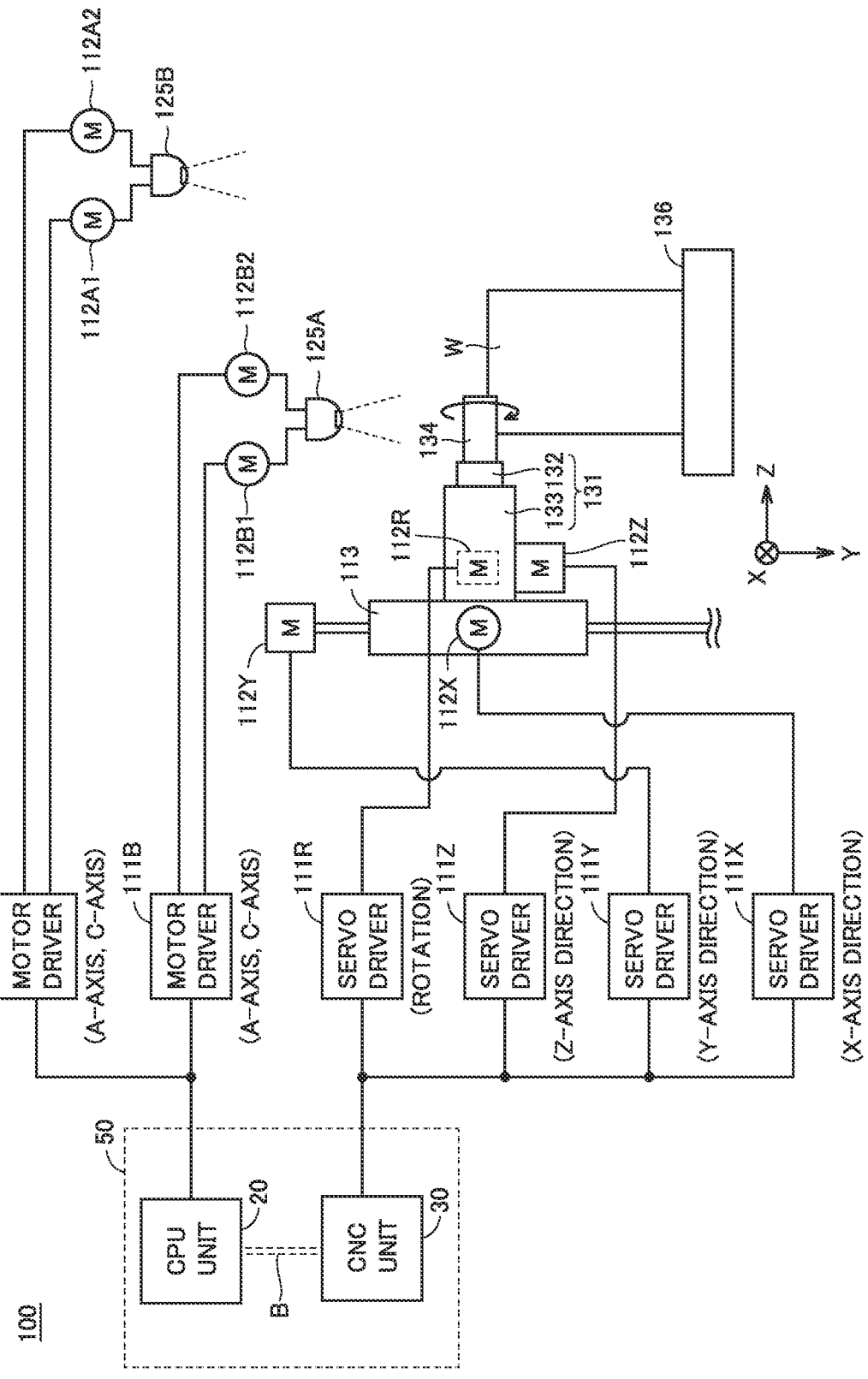
FIG. 4 is a view illustrating a configuration example of a drive mechanism in the machine tool.

With reference to FIG. 4, various drive mechanisms in machine tool 100 will be described below. FIG. 4 is a view illustrating a configuration example of a drive mechanism in machine tool 100.

As illustrated in FIG. 4, machine tool 100 includes a controller 50, motor drivers 111A, 111B, servo drivers 111R, 111X to 111Z, stepping motors 112A1, 112A2, 112B1, 112B2, servomotors 112R, 112X to 112Z, a moving body 113, discharge mechanisms 125A, 125B, spindle head 131, tool 134, and table 136.

"Controller 50" used in the present specification means a device that controls machine tool 100. The device configuration of controller 50 is arbitrary. Controller 50 may be constructed with a single control unit or a plurality of control units. In the example of FIG. 4, controller 50 includes a CPU unit 20 as a programmable logic control unit (PLC) and a CNC unit 30. CPU unit 20 and CNC unit 30 communicate with each other through a communication path B (for example, a fieldbus or a LAN cable).

CPU unit 20 controls various units constituting controller 50 according to a previously-designed PLC program. For example, the PLC program is described by a ladder program. CPU unit 20 controls motor driver 111A according to the PLC program, and controls the discharge of the coolant by discharge mechanism 125A and the rotational drive of discharge mechanism 125A. CPU unit 20 controls motor driver 111B according to the PLC program, and controls the discharge of the coolant by discharge mechanism 125B and the rotational drive of discharge mechanism 125B. CNC unit 30 starts execution of a previously-designed machining program in response to reception of a machining start instruction from CPU unit 20. For example, the machining program is described by a numerical control (NC) program. CNC unit 30 controls servo drivers 111R, 111X to 111Z according to the machining program to machine workpiece W fixed to table 136.

In the example of FIG. 4, motor driver 111A is illustrated as a two-shaft integrated driver. Motor driver 111A receives the input of the target rotation speed of stepping motor 112A1 and the input of the target rotation speed of stepping motor 112A2 from CPU unit 20, and controls each of stepping motors 112A1, 112A2.

Stepping motor 112A1 rotationally drives a discharge port of the coolant by discharge mechanism 125A according to an output current from motor driver 111A, and changes a discharge direction of the coolant in a rotation direction (that is, in an A-axis direction) with the X-axis direction as a rotation axis.

Stepping motor 112A2 rotationally drives the discharge port of the coolant by discharge mechanism 125A according to the output current from motor driver 111A, and changes the discharge direction of the coolant in the rotation direction (that is, in a C-axis direction) with the Z-axis direction as the rotation axis.

As described above, motor driver 111A individually controls the rotational drive in the A-axis direction by stepping motor 112A1 and the rotational drive in the C-axis direction by stepping motor 112A2, thereby discharging the coolant in an arbitrary direction toward machining area AR.

Motor driver 111B is a biaxial integrated driver. Motor driver 111B receives the input of the target rotation speed of stepping motor 112B1 and the input of the target rotation speed of stepping motor 112B2 from CNC unit 30, and controls each of stepping motors 112B1, 112B2. Because a method of controlling stepping motor 112B1, 112B2 by motor driver 111B is similar to that of motor driver 111A, the description thereof will not be repeated.

Servo driver 111R sequentially receives the input of the target rotation speed from CNC unit 30 and controls servomotor 112R. Servomotor 112R rotationally drives spindle 132 about the Z-axis direction.

More specifically, servo driver 111R calculates an actual rotation speed of servomotor 112R from a feedback signal of an encoder (not illustrated) detecting the rotation angle of servomotor 112R, increases the rotation speed of servomotor 112R when the actual rotation speed is smaller than the target rotation speed, and decreases the rotation speed of servomotor 112R when the actual rotation speed is larger than the target rotation speed. In this manner, servo driver 111R brings the rotation speed of servomotor 112R closer to the target rotation speed while sequentially receiving feedback of the rotation speed of servomotor 112R.

Servo driver 111X sequentially receives an input of a target position from CNC unit 30 and controls servomotor 112X. Servomotor 112X feeds and drives moving body 113 to which spindle head 131 is attached through a ball screw (not illustrated), and moves spindle 132 to an arbitrary position in the X-direction. Because a method for controlling servomotor 112X by servo driver 111X is similar to that of servo driver 111R, the description thereof will not be repeated.

Servo driver 111Y sequentially receives the input of the target position from CNC unit 30 and controls servomotor 112Y. Servomotor 112Y feeds and drives moving body 113 to which spindle head 131 is attached through a ball screw (not illustrated), and moves spindle 132 to an arbitrary position in the Y-direction. Because a method for controlling servomotor 112Y by servo driver 111Y is similar to that of servo driver 111R, the description thereof will not be repeated. Servo driver 111Z sequentially receives the input of the target position from CNC unit 30 and controls servomotor 112Z. Servomotor 112Z feeds and drives moving body 113 to which spindle head 131 is attached through a ball screw (not illustrated), and moves spindle 132 to an arbitrary position in the Z-direction. Because a method of controlling servomotor 112Z by servo driver 111Z is similar to that of servo driver 111R, the description thereof will not be repeated.

In the above description, servomotors 112X to 112Z that drive the discharge inhibited portion are exemplified as the drive mechanism (hereinafter, also referred to as a "first drive unit") that changes the relative position between the discharge inhibited portion (in the above-described example, spindle 132) and discharge mechanism 125, but the drive target by the first drive unit is not limited to the discharge inhibited portion. As an example, the first drive unit may change the relative position by feeding and driving discharge mechanism 125 instead of the discharge inhibited portion, or may change the relative position by feeding and driving both the discharge inhibited portion and discharge mechanism 125. When discharge mechanism 125 is fed and driven, in addition to stepping motor 112A1, 112A2, 112B1, 112B2 (hereinafter, also referred to as a "second drive unit") rotationally driving discharge mechanism 125, or instead of the second drive unit, a servomotor (not illustrated) feeding and driving discharge mechanism 125 is provided in machine tool 100 as the first drive unit. In this case, for example, discharge mechanism 125 is driven along a rail (not illustrated) provided on the ceiling of machine tool 100.

Furthermore, in the above description, the example in which the first drive unit is configured by three servomotors 112X to 112Z has been described. However, the first drive unit may be configured by at least one drive mechanism (for example, a servomotor) feeding and driving the discharge inhibited portion or discharge mechanism 125.

Furthermore, in the above description, an example in which the second drive unit is configured by two stepping motors 112A1, 112A2 (or 112B1, 112B2) has been described. However, the second drive unit may be configured by at least one drive mechanism (for example, a stepping motor or a servo motor).

<E. Functional Configuration of Machine Tool 100>

Figure 5:
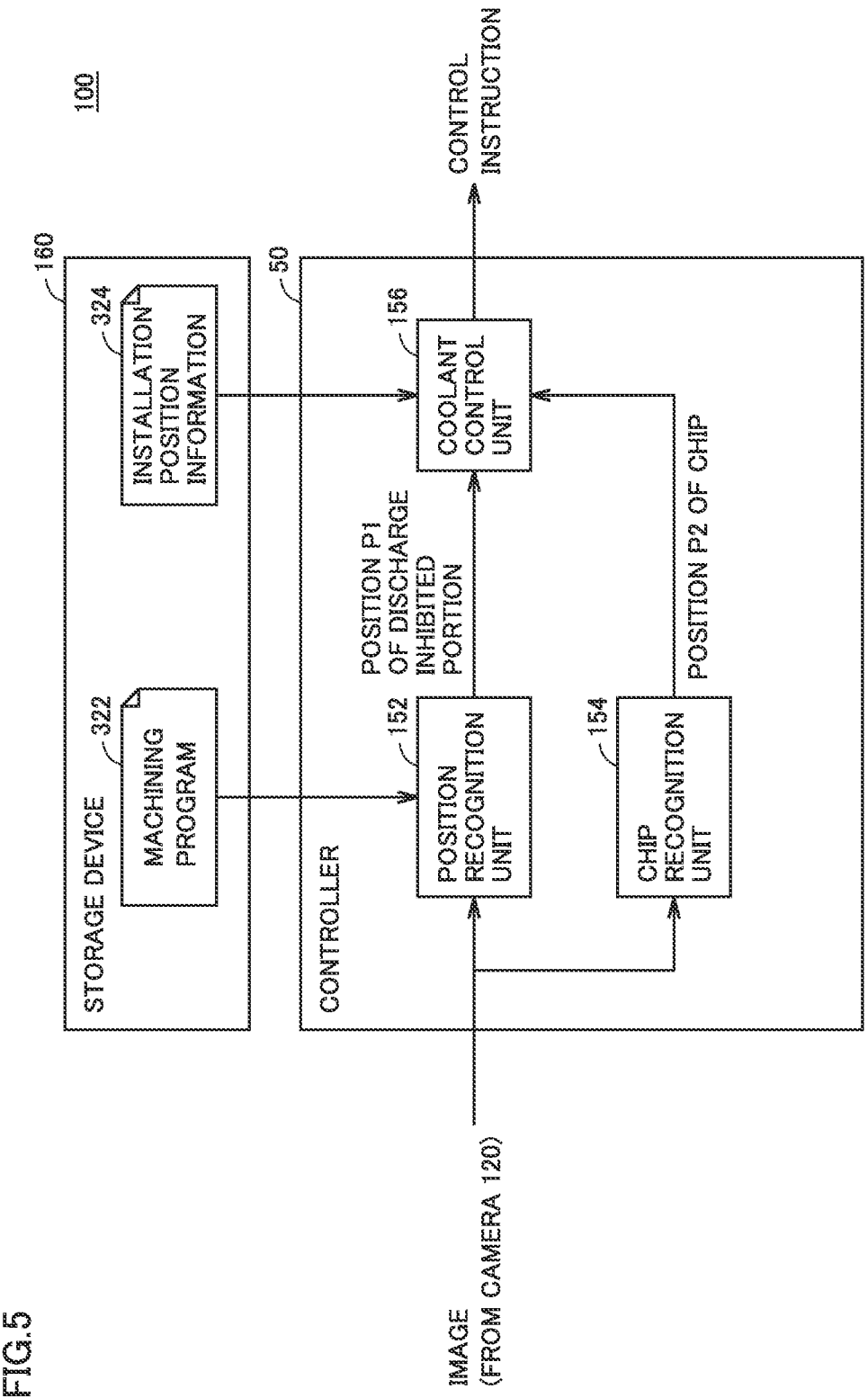
FIG. 5 is a view illustrating an example of a functional configuration of the machine tool.

With reference to FIGS. 5 to 10, a functional configuration of machine tool 100 will be described below. FIG. 5 is a view illustrating an example of the functional configuration of machine tool 100.

Machine tool 100 includes controller 50 and a storage device 160 as a main hardware configuration. Controller 50 includes a position recognition unit 152, a chip recognition unit 154, and a coolant control unit 156 as a functional configuration. These functional configurations may be implemented in CPU unit 20 (see FIG. 4) or implemented in CNC unit 30 (see FIG. 4).

The functional configurations of position recognition unit 152, chip recognition unit 154, and coolant control unit 156 will be sequentially described below.

(E1. Position Recognition Unit 152)

Figure 6:
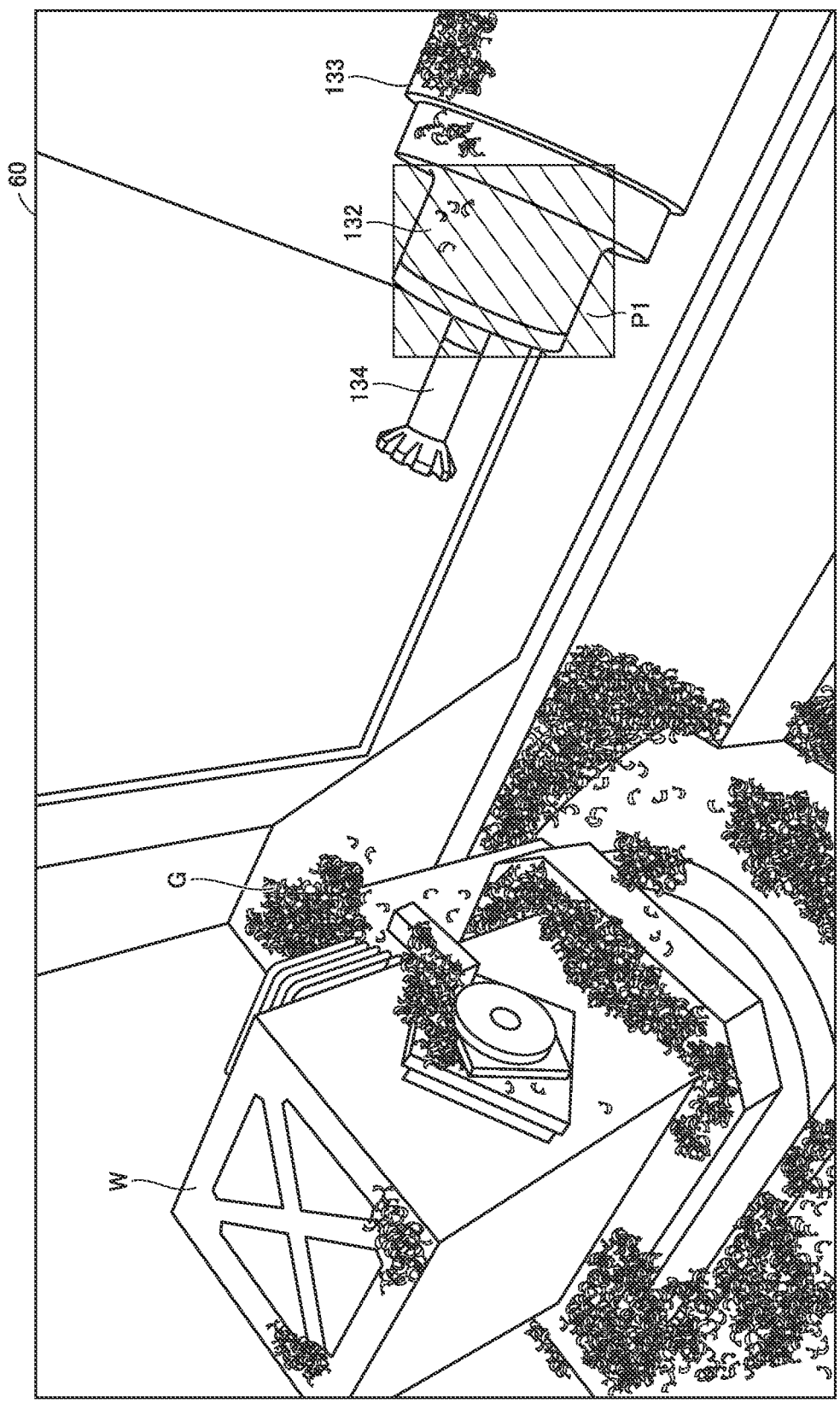
FIG. 6 is a view illustrating an image obtained from a camera.

With reference to FIG. 6, the function of position recognition unit 152 will be described.

Position recognition unit 152 recognizes the position in machine tool 100 of the moving object between discharge mechanism 125 and the discharge inhibited portion. Hereinafter, an example in which position recognition unit 152 recognizes the position of the discharge inhibited portion will be described, but when discharge mechanism 125 is configured to be drivable, position recognition unit 152 recognizes the position of discharge mechanism 125. A method for recognizing the position of the discharge inhibited portion described below can also be applied to the recognition of the position of discharge mechanism 125.

(a) Method 1 for Recognizing Position of Discharge Inhibited Portion

For example, the position of the discharge inhibited portion is recognized based on an image obtained from camera 120. In this case, camera 120 is disposed so as to include the discharge inhibited portion in the field of view of camera 120.

FIG. 6 is a view illustrating an image 60 obtained from camera 120. Position recognition unit 152 recognizes the position of the discharge inhibited portion from image 60 by executing predetermined image processing.

As an example, the position of the discharge inhibited portion is recognized using a learned model. The learned model is previously generated by learning processing using a learning data set. The learning data set includes a plurality of learning images in which the discharge inhibited portion is photographed. Each learning image is associated with a label (alternatively, a label indicating the type of the discharge inhibited portion) indicating whether the discharge inhibited portion is photographed. An internal parameter of the learned model are previously optimized by the learning processing using such the learning data set.

Various machine learning algorithms can be adopted as a learning method for generating the learned model. As an example, deep learning, a convolution neural network (CNN), a full-layer convolutional neural network (FCN), a support vector machine, or the like is adopted as a machine learning algorithm.

Position recognition unit 152 divides image 60 into a plurality of regions, and inputs partial images of the respective sections to the learned model. As a result, the learned model outputs a probability in which the discharge inhibited portion is included in the input partial image. Position recognition unit 152 recognizes the position of the partial image where the probability exceeds a predetermined value as a position P1 of the discharge inhibited portion. For example, position P1 of discharge inhibited portion 170 is defined by a representative point (for example, a center point of discharge inhibited portion 170) in a region representing discharge inhibited portion 170. Recognized position P1 is output to coolant control unit 156.

The method for recognizing the position of the discharge inhibited portion is not limited to the method using the learned model, but image processing based on a rule base may be adopted. As an example, position recognition unit 152 previously holds a reference image representing the discharge inhibited portion, and scans the reference image in image 60 to calculate similarity with the reference image for each region in image 60. Then, position recognition unit 152 recognizes a region where the similarity exceeds a predetermined value as position P1 of the discharge inhibited portion.

In the embodiment, position recognition unit 152 recognizes position P1 of the discharge inhibited portion using a single algorithm. However, the present invention is not limited to this configuration, but position P1 of the discharge inhibited portion may be recognized by a plurality of algorithms.

(b) Method 2 for Recognizing Position of Discharge Inhibited Portion

As another example, the position of the discharge inhibited portion is recognized based on a machining program 322 defining a drive instruction for the discharge inhibited portion. For example, machining program 322 defines drive instructions of servo drivers 111X to 111Z (see FIG. 4).

Typically, machining program 322 includes an instruction code designating a movement destination of the discharge inhibited portion. Position recognition unit 152 recognizes the instruction code currently executed in machining program 322, and recognizes the movement destination of the discharge inhibited portion included in the instruction code as position P1 of the discharge inhibited portion. Recognized position P1 of the discharge inhibited portion is output to coolant control unit 156.

(E2. Chip Recognition Unit 154)

Figure 7:
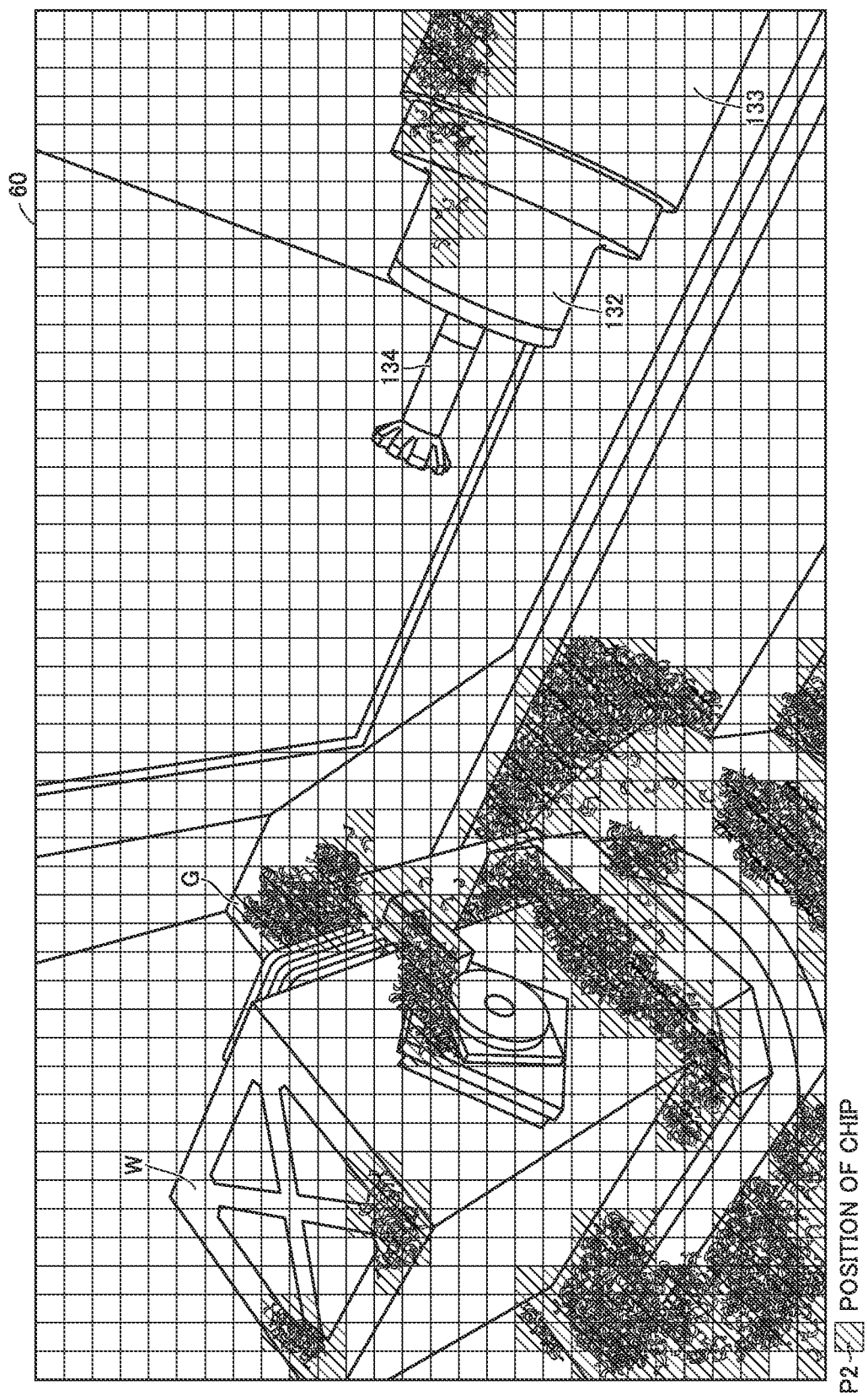
FIG. 7 is a view illustrating a chip region recognized from the image in FIG. 6.

With reference to FIG. 7, a function of chip recognition unit 154 will be described below.

Chip recognition unit 154 recognizes the position of the chip in machine tool 100. The position of the chip may be recognized in any manner. As an example, the position of the chip is recognized based on the image obtained from camera 120.

As an example, the position of the chip is recognized using the learned model. The learned model is previously generated by learning processing using a learning data set. The learning data set includes a plurality of learning images in which the chip is Each learning image is associated with a label (alternatively, a label photographed. I indicating the type of chip) indicating whether the chip is illustrated. An internal parameter of the learned model are previously optimized by the learning processing using such the learning data set.

Various machine learning algorithms can be adopted as a learning method for generating the learned model. As an example, deep learning, a convolution neural network (CNN), a full-layer convolutional neural network (FCN), a support vector machine, or the like is adopted as a machine learning algorithm.

The learned model receives the input of the image obtained from camera 120 and outputs a position P2 of the chip photographed in the image. FIG. 7 is a view illustrating a chip region recognized from image 60 in FIG. 6.

More specifically, chip recognition unit 154 divides image 60 into a plurality of regions, and inputs the partial image of each section to the learned model. As a result, the learned model outputs the probability that the input partial image includes the chip. Chip recognition unit 154 recognizes the position of the partial image in which the probability exceeds a predetermined value as chip position P2. Recognized position P2 is output to coolant control unit 156.

The method for recognizing the position of the chip is not limited to the above-described method using the learned model, but the image processing based on the rule base may be adopted. As an example, a frequency component included in the partial image tends to increase as the number of chips increases. Accordingly, chip recognition unit 154 performs frequency analysis such as fast Fourier transform (FFT) and acquires a spectral image for each partial image. Each pixel value of the spectrum image represents a correlation value with the waveform of each frequency. Chip recognition unit 154 recognizes a region of the partial image in which the pixel value exceeds a predetermined value in a predetermined high-frequency band as chip position P2.

In the embodiment, chip recognition unit 154 recognizes position P2 of the chip using a single algorithm. However, the present invention is not limited to this configuration, but chip position P2 may be recognized by a plurality of algorithms.

(E3. Coolant Control Unit 156)

A function of coolant control unit 156 will be described below.

Coolant control unit 156 controls the discharge of the coolant by discharge mechanism 125 such that the coolant is not discharged to the discharge inhibited portion based on position P1 (see FIG. 6) of the discharge inhibited portion recognized by position recognition unit 152. Accordingly, the coolant can be prevented from adhering to the discharge inhibited portion.

As more specific processing, coolant control unit 156 transforms position P1 indicated in the first coordinate system into the second coordinate system based on a predetermined coordinate transformation matrix for transformation from a coordinate system (hereinafter, also referred to as a "first coordinate system") based on camera 120 to a coordinate system (hereinafter, also referred to as a "second coordinate system") in machining area AR (see FIGS. 2 and 3). Subsequently, coolant control unit 156 acquires the position of discharge mechanism 125 from predetermined installation position information 324. For example, the position of discharge mechanism 125 is indicated by the second coordinate system. Coolant control unit 156 calculates a discharge exclusion angle of the coolant by discharge mechanism 125 based on position P1 of the discharge inhibited portion indicated by the second coordinate system and the position of discharge mechanism 125 indicated by the second coordinate system. Thereafter, coolant control unit 156 controls the discharge direction of the coolant by discharge mechanism 125 so as to exclude the calculated discharge exclusion angle. The discharge direction of the coolant can be changed by controlling stepping motors 112A1, 112A2, 112B1, 112B2.

Figure 8:
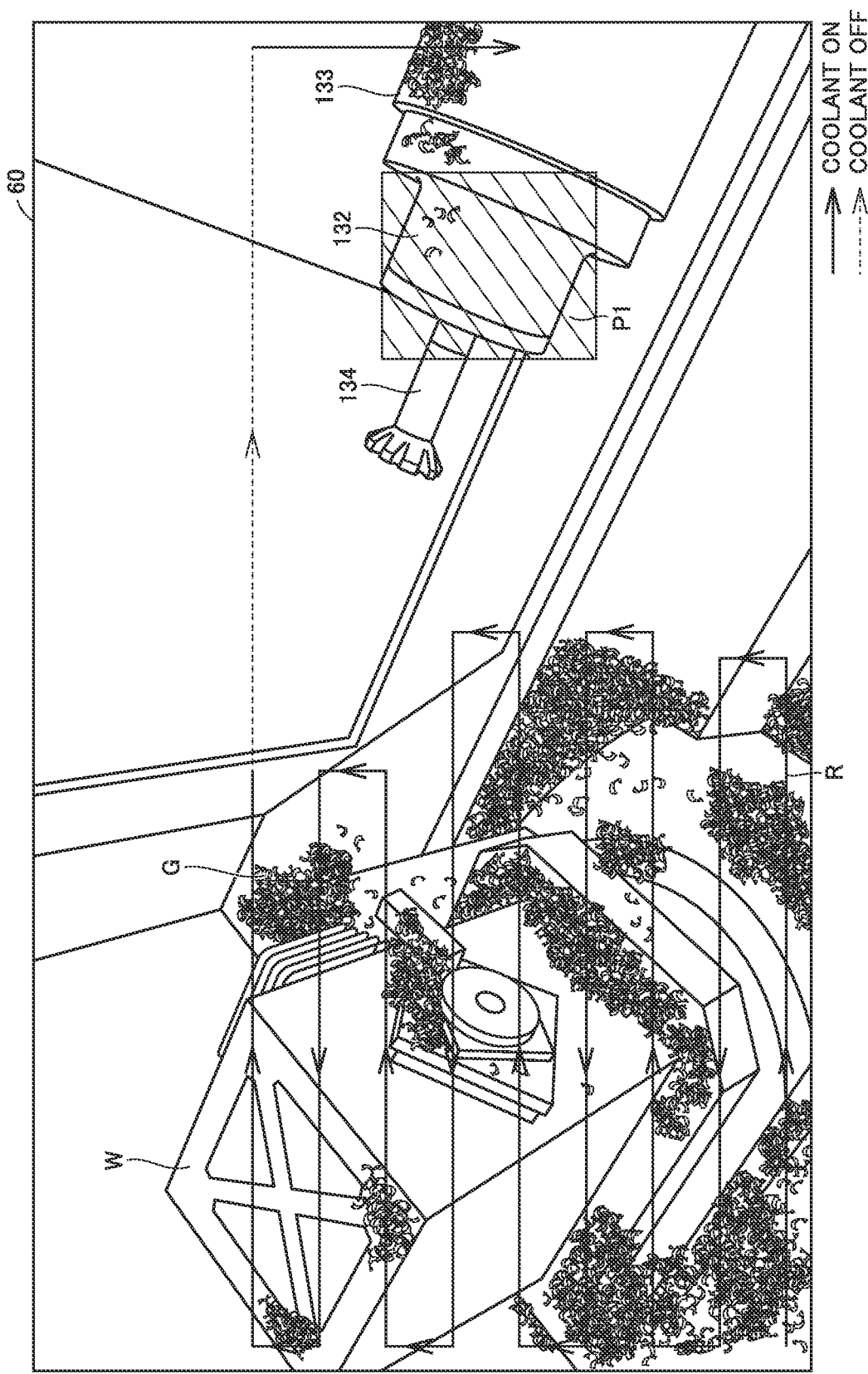
FIG. 8 is a view illustrating a cleaning path by a discharge mechanism.

Preferably, coolant control unit 156 produces a coolant cleaning path R by discharge mechanism 125 based on each of chip positions P2 (see FIG. 7) recognized by chip recognition unit 154. Typically, coolant control unit 156 produces cleaning path R so as to pass through each of chip positions P2. FIG. 8 is a view illustrating cleaning path R by discharge mechanism 125.

Thereafter, coolant control unit 156 controls the discharge direction of the coolant by discharge mechanism 125 according to produced cleaning path R. At this time, coolant control unit 156 produces cleaning path R so as to avoid position P1 of the discharge inhibited portion. Alternatively, coolant control unit 156 may turn off the discharge of the coolant when the discharge port of the coolant in discharge mechanism 125 faces the direction of position P1 of the discharge inhibited portion.

Figure 9:
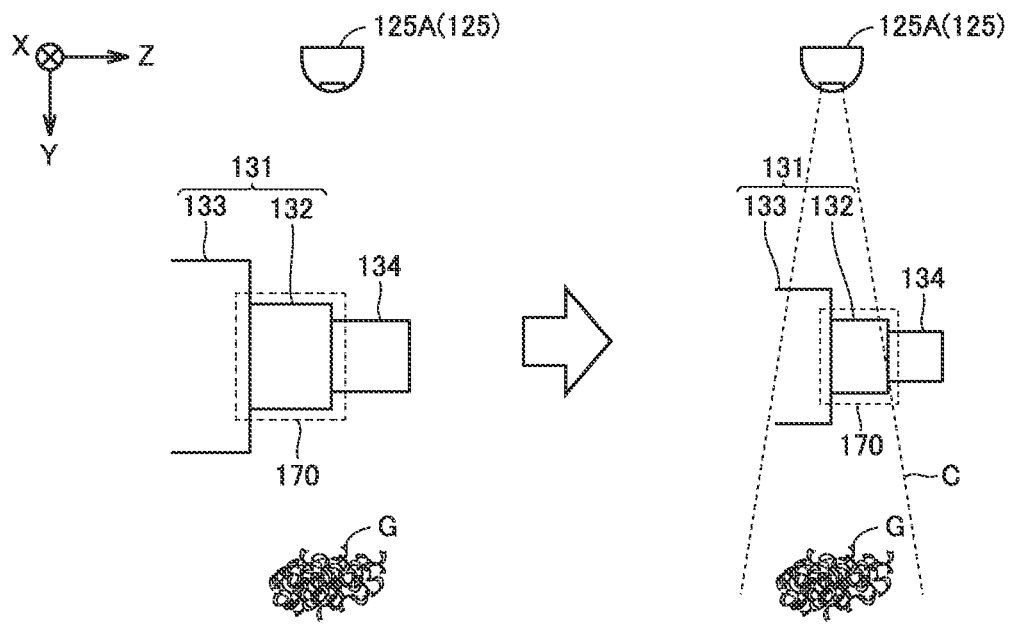
FIG. 9 is a view illustrating a positional relationship among the discharge mechanism, a discharge inhibited portion, and a chip of a workpiece.
Figure 9:
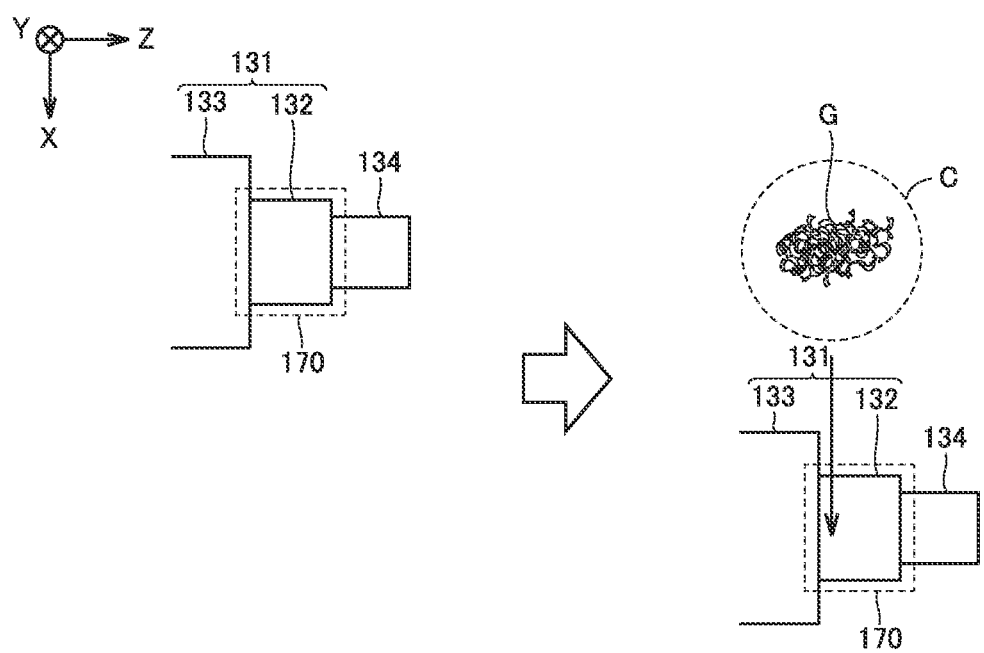

With reference to FIG. 9, the function of coolant control unit 156 will be further described. FIG. 9 is a view illustrating a positional relationship among discharge mechanism 125A, discharge inhibited portion 170, and a chip G of the workpiece.

As illustrated in FIG. 9, sometimes discharge inhibited portion 170 is located between discharge mechanism 125A and chip G. In this case, when discharge mechanism 125A discharges the coolant toward chip G, the coolant adheres to discharge inhibited portion 170. Accordingly, when discharge inhibited portion 170 is located between discharge mechanism 125A and chip G, controller 50 of machine tool 100 moves discharge inhibited portion 170 such that discharge inhibited portion 170 is not located between discharge mechanism 125A and chip G, and starts the discharge of the coolant by discharge mechanism 125A after the movement. In the example of FIG. 9, coolant control unit 156 discharges a coolant C toward chip G after moving discharge inhibited portion 170 in the X-direction.

As more specific processing, coolant control unit 156 acquires position P1 of discharge inhibited portion 170 from position recognition unit 152. Furthermore, coolant control unit 156 acquires position P2 of chip G from chip recognition unit 154. Coolant control unit 156 further acquires information indicating the position (hereinafter, also referred to as a "position P3") of discharge mechanism 125A. Thereafter, coolant control unit 156 determines whether discharge inhibited portion 170 is located between chip G and discharge mechanism 125A based on position P1 of discharge inhibited portion 170, position P2 of chip G, and position P3 of discharge mechanism 125A. As an example, coolant control unit 156 calculates a first direction from position P3 of discharge mechanism 125A toward position P1 of discharge inhibited portion 170 and a second direction from position P3 of discharge mechanism 125A toward position P2 of chip G. Thereafter, coolant control unit 156 calculates an angle between the first direction and the second direction, and determines that discharge inhibited portion 170 is located between chip G and discharge mechanism 125A when the calculated angle is less than or equal to a predetermined angle (for example, less than or equal to 10 degrees). In this case, coolant control unit 156 starts the discharge of coolant C after driving discharge inhibited portion 170. Accordingly, coolant control unit 156 can remove chip G while preventing coolant C from being discharged to discharge inhibited portion 170.

Figure 10:
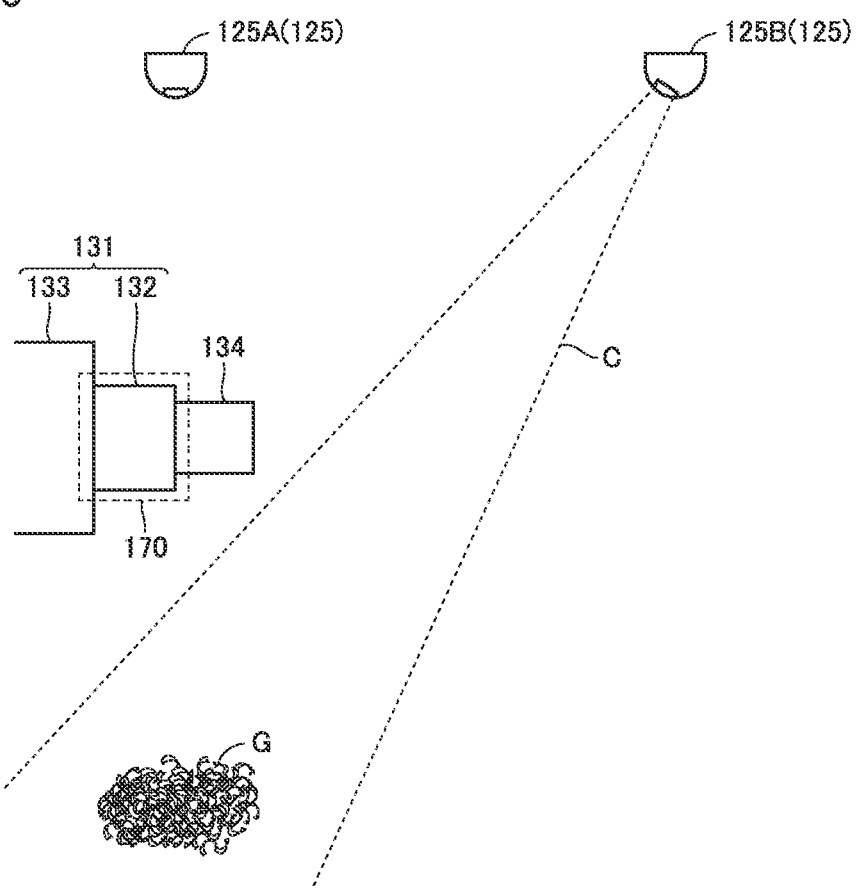
FIG. 10 is a view illustrating the positional relationship among the discharge mechanism, the discharge inhibited portion, and the chip of the workpiece.

With reference to FIG. 10, the function of coolant control unit 156 will be further described. FIG. 10 is a view illustrating the positional relationship among discharge mechanism 125A, 125B, discharge inhibited portion 170, and chip G of the workpiece.

As illustrated in FIG. 10, when a plurality of discharge mechanisms 125 (for example, discharge mechanisms 125A, 125B) are provided in machine tool 100, coolant control unit 156 selectively controls the discharge of the coolant by discharge mechanism 125A (first discharge unit) and the discharge of the coolant by discharge mechanism 125B (second discharge unit) such that the coolant is not discharged to discharge inhibited portion 170.

More specifically, coolant control unit 156 calculates the angle between the direction from a position P3A of discharge mechanism 125A toward position P1 of discharge inhibited portion 170 and the direction from position P3A of discharge mechanism 125A toward position P2 of chip G. When the angle is less than or equal to a predetermined angle (for example, less than or equal to 10 degrees), coolant control unit 156 inhibits the discharge of the coolant by discharge mechanism 125A.

Similarly, coolant control unit 156 calculates the angle between the direction from a position P3B of discharge mechanism 125B toward position P1 of discharge inhibited portion 170 and the direction from position P3B of discharge mechanism 125B toward position P2 of chip G. When the angle is greater than a predetermined angle (for example, 10 degrees), coolant control unit 156 controls the angle of the discharge port of discharge mechanism 125B so as to face position P2 of chip G, and executes the discharge of the coolant by discharge mechanism 125B. The angle of the discharge port of discharge mechanism 125B is adjusted by driving and controlling stepping motors 112B1, 112B2.

As described above, coolant control unit 156 controls at least one of on and off of the coolant discharge and the coolant discharge direction for each of discharge mechanisms 125A, 125B such that the coolant is not discharged to discharge inhibited portion 170. Accordingly, coolant control unit 156 can remove chip G without driving discharge inhibited portion 170.

<F. Hardware Configuration of Controller 50>

Figure 11:
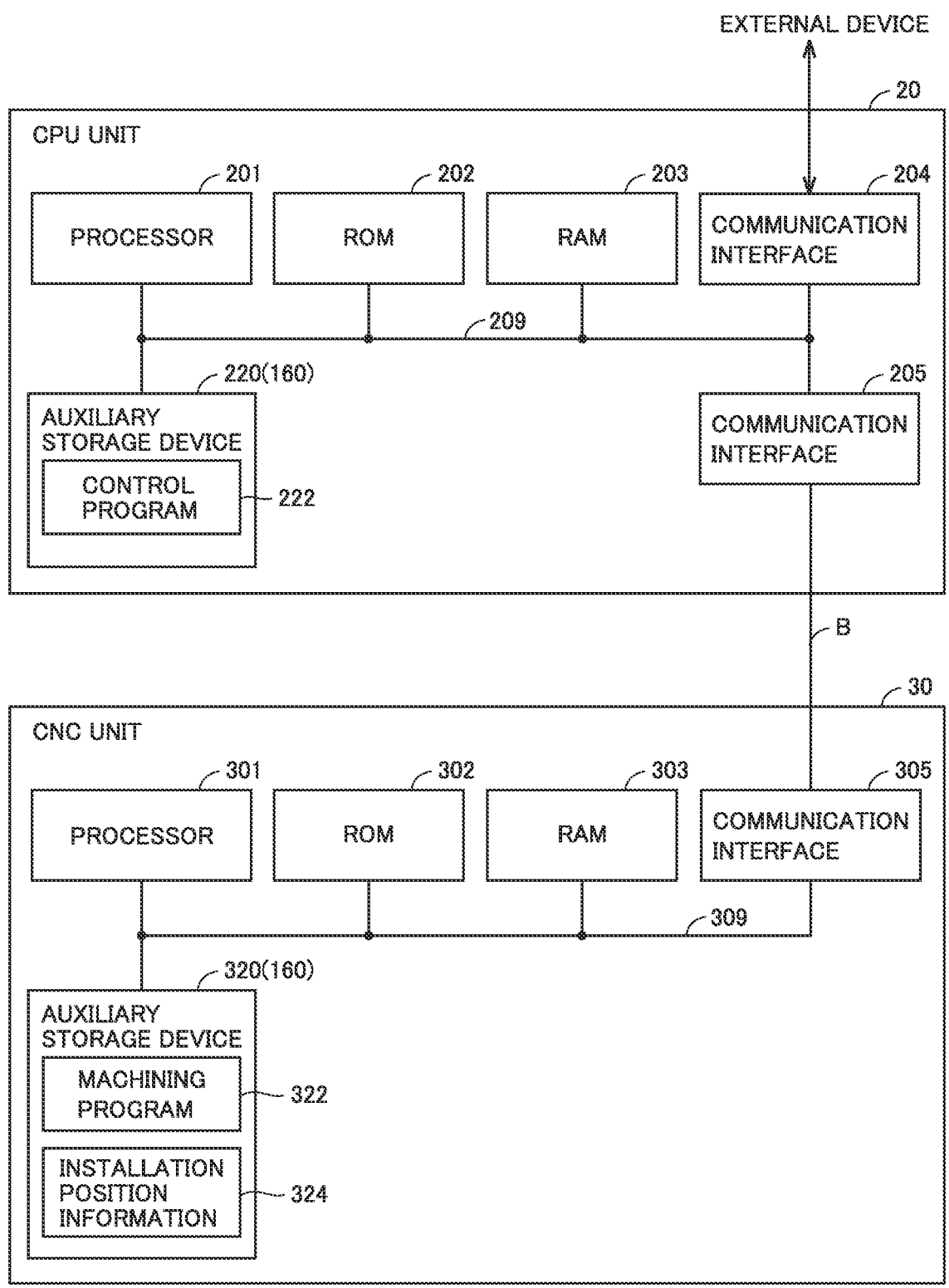
FIG. 11 is a view illustrating an example of a hardware configuration of a controller.

With reference to FIG. 11, a hardware configuration of controller 50 in FIG. 4 will be described below. FIG. 11 is a view illustrating an example of the hardware configuration of controller 50.

As illustrated in FIG. 11, controller 50 includes CPU unit 20 and CNC unit 30. For example, CPU unit 20 and CNC unit 30 are connected to each other through communication path B.

Hereinafter, the hardware configuration of CPU unit 20 and the hardware configuration of CNC unit 30 will be described in order.

(F1. Hardware Configuration of CPU Unit 20)

CPU unit 20 includes a processor 201, a read only memory (ROM) 202, a random access memory (RAM) 203, communication interfaces 204, 205, and an auxiliary storage device 220. These components are connected to an internal bus 209.

For example, processor 201 is constructed with at least one integrated circuit. For example, the integrated circuit may be constructed with at least one CPU, at least one graphics processing unit (GPU), at least one application specific integrated circuit (ASIC), at least one field programmable gate array (FPGA), or a combination thereof.

Processor 201 controls the operations of CPU unit 20 by executing various programs such as a control program 222. Control program 222 defines instructions controlling various devices in machine tool 100. Processor 201 reads control program 222 from auxiliary storage device 220 or ROM 202 to RAM 203 based on the reception of the execution instruction of control program 222. RAM 203 functions as a working memory, and temporarily stores various data required for the execution of control program 222.

Communication interface 204 is an interface that implements the communication using a local area network (LAN) cable, a wireless LAN (WLAN), Bluetooth (registered trademark), or the like. As an example, CPU unit 20 implements the communication with an external device such as motor drivers 111A, 111B through a communication interface 305.

Communication interface 205 is an interface implementing the communication with various units connected to the fieldbus. CNC unit 30 or an I/O unit (not illustrated) can be cited as an example of the unit connected to the fieldbus.

The auxiliary storage device 220 is an example of the above-described storage device 160 (see FIG. 5). For example, auxiliary storage device 220 is a storage medium such as a hard disk or a flash memory. Auxiliary storage device 220 stores control program 222 and the like. The storage location of control program 222 is not limited to auxiliary storage device 220, but may be stored in the storage area (for example, a cache memory) of processor 201, ROM 202, RAM 203, the external device (for example, a server), or the like.

Control program 222 may be provided not as a standalone program, but as a part of an arbitrary program. In this case, various pieces of processing of the embodiment is performed in cooperation with an arbitrary program. Even a program that does not include such a part of modules does not deviate from the purpose of control program 222 of the embodiment. Furthermore, some or all of the functions provided by control program 222 may be performed by dedicated hardware. Further, CPU unit 20 may be configured in a form of what is called cloud service in which at least one server executes a part of the processing of control program 222.

(F2. Hardware Configuration of CPU Unit 20)

With reference to FIG. 11, the hardware configuration of CNC unit 30 will be described below.

CNC unit 30 includes a processor 301, a ROM 302, a RAM 303, a communication interface 305, a communication interface 305, and an auxiliary storage device 320. These components are connected to an internal bus 309.

For example, processor 301 is constructed with at least one integrated circuit. For example, the integrated circuit may be constructed with at least one CPU, at least one ASIC, at least one FPGA, or a combination thereof.

Processor 301 controls the operation of CNC unit 30 by executing various programs such as machining program 322. Machining program 322 is a program implementing workpiece machining. Processor 301 reads machining program 322 from ROM 302 in RAM 303 based on the reception of the execution instruction of machining program 322. RAM 303 functions as a working memory, and temporarily stores various data required for the execution of machining program 322.

Communication interface 305 is an interface that implements the communication using LAN, WLAN, Bluetooth, or the like. As an example, CNC unit 30 implements the communication with CPU unit 20 through communication interface 305. In addition, CNC unit 30 implements the communication with various drive units (for example, servo drivers 111R, 111X to 111Z, and the like) for the workpiece machining through communication interface 305 or another communication interface.

For example, auxiliary storage device 320 is a storage medium such as a hard disk or a flash memory. Auxiliary storage device 320 stores a machining program 322, various installation position information 324, and the like.

For example, machining program 322 is described by an NC program. For example, machining program 322 includes an instruction code specifying a movement destination of spindle 132 in the X- to Z-directions, an instruction code specifying a coolant discharge direction by discharge mechanism 125, and an instruction code specifying on and off of the coolant discharge by discharge mechanism 125.

Installation position information 324 includes position information about various devices in machine tool 100. As an example, installation position information 324 includes position information about discharge mechanism 125, position information (not illustrated) about camera 120, and the like.

The storage location of machining program 322 or installation position information 324 is not limited to auxiliary storage device 320, but may be stored in the storage area (for example, the cache memory) of processor 301, ROM 302, RAM 303, the external device (for example, the server), and the like.

Machining program 322 may be provided not as a standalone program, but as a part of an arbitrary program. In this case, various pieces of processing of the embodiment is performed in cooperation with an arbitrary program. Even a program that does not include such a part of modules does not deviate from the purpose of machining program 322 of the embodiment. Furthermore, some or all of the functions provided by machining program 322 may be performed by dedicated hardware. Furthermore, CNC unit 30 may be configured in a form of what is called cloud service in which at least one server executes a part of the processing of machining program 322.

<G. Control Structure of Controller 50>

Figure 12:
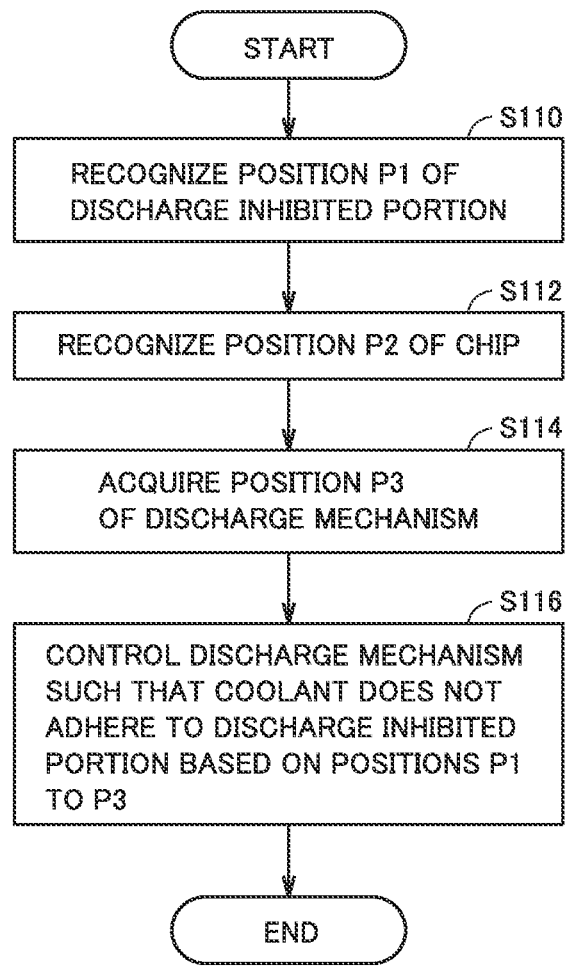
FIG. 12 is a flowchart illustrating an example of coolant control.

With reference to FIG. 12, a flowchart related to coolant control will be described. FIG. 12 is the flowchart illustrating an example of the coolant control. For example, the processing in FIG. 12 is executed by controller 50 of machine tool 100.

In step S110, controller 50 functions as position recognition unit 152 (see FIG. 5), and recognizes position P1 of the discharge inhibited portion in machine tool 100. Because the function of position recognition unit 152 is as described above, the description thereof will not be repeated. At the time of step S110, recognized position P1 of the discharge inhibited portion is represented by the coordinate system (that is, the first coordinate system) based on camera 120.

In step S112, controller 50 functions as chip recognition unit 154 (see FIG. 5) and recognizes position P2 of chip G of the workpiece in machine tool 100. Since the function of chip recognition unit 154 is as described above, the description thereof will not be repeated. At the time of step S112, recognized position P2 of the chip is represented by the coordinate system (that is, the first coordinate system) based on camera 120.

In step S114, controller 50 acquires position P3 of discharge mechanism 125 in machine tool 100. Typically, position P3 of discharge mechanism 125 is defined by installation position information 324 (see FIG. 11). For example, position P3 of discharge mechanism 125 is indicated by the coordinate system (that is, the second coordinate system) in machining area AR (See FIGS. 2 and 3).

In step S116, controller 50 functions as coolant control unit 156 (see FIG. 5), and controls discharge mechanism 125 such that the coolant does not adhere to the discharge inhibited portion. More specifically, controller 50 transforms position P1 of the discharge inhibited portion recognized in step S112 and position P2 of the chip recognized in step S114 from the first coordinate system to the second coordinate system based on a predetermined coordinate transformation matrix for the transformation from the first coordinate system to the second coordinate system. Subsequently, coolant control unit 156 of controller 50 controls discharge mechanism 125 such that the coolant does not adhere to the discharge inhibited portion based on position P1 of the discharge inhibited portion indicated by the second coordinate system, position P2 of the chip indicated by the second coordinate system, and position P3 of discharge mechanism 125 indicated by the second coordinate system.

<H. Summary>

As described above, machine tool 100 of the embodiment recognizes the position of the discharge inhibited portion, and controls the discharge of the coolant by discharge mechanism 125 such that the coolant is not discharged to the discharge inhibited portion. Accordingly, machine tool 100 can prevent the coolant from adhering to the discharge inhibited portion in which the position changes each time.

It should be considered that the disclosed embodiment is an example in all respects and not restrictive. The scope of the present invention is defined by not the description above, but the claims, and it is intended that all modifications within the meaning and scope of the claims are included in the present invention.

REFERENCE SIGNS LIST

20: CPU unit, 30: CNC unit, 50: controller, 60: image, 100: machine tool, 111A, 111B: motor driver, 111R, 111X, 111Y, 111Z: servo driver, 112A1, 112A2, 112B1, 112B2: stepping motor, 112R, 112X, 112Y, 112Z: servomotor, 113: moving body, 120, 120A, 120B: camera, 125, 125A, 125B: discharge mechanism, 127: collection mechanism, 130: cover, 131: spindle head, 132: spindle, 133: housing, 134: tool, 136: table, 140: operation panel, 142: display, 152: position recognition unit, 154: chip recognition unit, 156: coolant control unit, 160: storage device, 170: discharge inhibited portion, 201, 301: processor, 202, 302: ROM, 203, 303: RAM, 204, 205, 305: communication interface, 209, 309: internal bus, 220, 320: auxiliary storage device, 222: control program, 322: machining program, 324: installation position information The intention claimed is:

1. A machine tool capable of machining a workpiece, the machine tool comprising:
a first discharge unit that discharges a coolant removing a chip of the workpiece;
a portion inside the machine tool and to which the coolant should not be discharged;
a first drive unit that changes a relative position between the first discharge unit and the portion by moving at least one of the first discharge unit and the portion; and
a control unit that controls the machine tool,
wherein the control unit performs
processing for recognizing a position in the machine tool of a moving object by the first drive unit between the first discharge unit and the portion, and
processing for controlling the discharge of the coolant by the first discharge unit such that the coolant is not discharged to the portion based on the position recognized in the recognition processing.

2. The machine tool according to claim 1, further comprising a second drive unit that drives a discharge port of the coolant by the first discharge unit,
wherein the moving object is the portion, and
in the control processing, drive of the discharge port by the second drive unit is controlled such that the coolant is not discharged to the position of the portion.

3. The machine tool according to claim 2, further comprising a second discharge unit that discharges the coolant removing the chip of the workpiece,
wherein the control processing includes processing for controlling the discharge of the coolant by the first discharge unit and the discharge of the coolant by the second discharge unit such that the coolant is not discharged to the portion.

4. The machine tool according to claim 2, further comprising a camera that photographs the portion,
wherein the position of the portion in the machine tool is recognized based on an image obtained from the camera.

5. The machine tool according to claim 1, wherein the position of the portion in the machine tool is recognized by analyzing a drive program for the movement of the portion by the first drive unit.

6. The machine tool according to claim 1, wherein
the control unit further executes processing for recognizing a position of the chip of the workpiece, and
the control processing includes processing for causing the first drive unit to change the relative position such that the portion is not located between the first discharge unit and the chip when the portion is located between the first discharge unit and the chip, and starting the discharge of the coolant by the first discharge unit after the movement.

7. The machine tool according to claim 1, wherein the portion includes at least one of a sensor measuring a size of a tool for machining the workpiece, a sensor measuring a physical quantity related to the workpiece, a camera provided in the machine tool, a surface of a spindle provided in the machine tool, and a workpiece to be machined by dry machining.

8. A method for controlling a machine tool capable of machining a workpiece,
the machine tool including:
a discharge unit that discharges a coolant removing a chip of the workpiece;
a portion inside the machine tool and to which the coolant should not be discharged; and
a drive unit that changes a relative position between the discharge unit and the portion by moving at least one of the discharge unit and the portion,
the control method comprising:
recognizing a position in the machine tool of a moving object by the drive unit between the discharge unit and the portion; and
controlling discharge of the coolant by the discharge unit such that the coolant is not discharged to the portion based on the position recognized in the recognizing.

9. The method according to claim 8, further comprising a second drive unit that drives a discharge port of the coolant by the first discharge unit,
wherein the moving object is the portion, and
in the process of controlling discharge of the coolant, drive of the discharge port by the second drive unit is controlled such that the coolant is not discharged to the position of the portion.

10. The machine tool according to claim 9, further comprising a second discharge unit that discharges the coolant removing the chip of the workpiece,
wherein the process of controlling discharge of the coolant includes processing for controlling the discharge of the coolant by the first discharge unit and the discharge of the coolant by the second discharge unit such that the coolant is not discharged to the portion.

11. The machine tool according to claim 9, further comprising a camera that photographs the portion,
wherein the position of the portion in the machine tool is recognized based on an image obtained from the camera.

12. The machine tool according to claim 9, wherein the position of the portion in the machine tool is recognized by analyzing a drive program of the portion by the second drive unit.

13. The machine tool according to claim 8, wherein
the control unit further executes processing for recognizing a position of the chip of the workpiece, and the process of controlling discharge of the coolant includes processing for causing the first drive unit to move the relative position such that the portion is not located between the first discharge unit and the chip when the portion is located between the first discharge unit and the chip, and starting the discharge of the coolant by the first discharge unit after the movement.

14. The machine tool according to claim 8, wherein the portion includes at least one of a sensor measuring a size of a tool for machining the workpiece, a sensor measuring a physical quantity related to the workpiece, a camera provided in the machine tool, a surface of a spindle provided in the machine tool, and a workpiece to be machined by dry machining.

15. A non-transitory computer-readable medium storing a control program for a machine tool capable of machining a workpiece, the machine tool including:
a discharge unit that discharges a coolant removing a chip of the workpiece;
a portion inside the machine tool and to which the coolant should not be discharged; and
a drive unit that changes a relative position between the discharge unit and the portion by moving at least one of the discharge unit and the portion,
the control program causing the machine tool to execute:
recognizing a position in the machine tool of a moving object by the drive unit between the discharge unit and the portion; and
controlling the discharge of the coolant by the discharge unit such that the coolant is not discharged to the portion based on the position recognized in the recognizing.

16. The non-transitory computer-readable medium according to claim 15, further comprising a second drive unit that drives a discharge port of the coolant by the first discharge unit,
wherein the moving object is the portion, and
in the process of controlling discharge of the coolant, drive of the discharge port by the second drive unit is controlled such that the coolant is not discharged to the position of the portion.

17. The non-transitory computer-readable medium according to claim 16, further comprising a second discharge unit that discharges the coolant removing the chip of the workpiece,
wherein the process of controlling discharge of the coolant includes processing for controlling the discharge of the coolant by the first discharge unit and the discharge of the coolant by the second discharge unit such that the coolant is not discharged to the portion.

18. The non-transitory computer-readable medium according to claim 16, further comprising a camera that photographs the portion,
wherein the position of the portion in the machine tool is recognized based on an image obtained from the camera.

19. The non-transitory computer-readable medium according to claim 16, wherein the position of the portion in the machine tool is recognized by analyzing a drive program of the portion by the second drive unit.

20. The non-transitory computer-readable medium according to claim 15, wherein
the control unit further executes processing for recognizing a position of the chip of the workpiece, and
the process of controlling discharge of the coolant includes processing for causing the first drive unit to move the relative position such that the portion is not located between the first discharge unit and the chip when the portion is located between the first discharge unit and the chip, and starting the discharge of the coolant by the first discharge unit after the movement.

* * * * *

UNITED STATES PATENT AND TRADEMARK OFFICE
CERTIFICATE OF CORRECTION

PATENT NO. : 12,325,100 B2
APPLICATION NO. : 17/913513
DATED : June 10, 2025
INVENTOR(S) : Yoshihiko Nakajima, Kenjiro Iga and Hiroshi Shimanoe Page 1 of 1

It is certified that error appears in the above-identified patent and that said Letters Patent is hereby corrected as shown below:

In the Claims

In Claim 5, the dependency numeral '1' should read --2--.

Signed and Sealed this
Thirtieth Day of September, 2025

John A. Squires
*Director of the United States Patent and Trademark Office*